Patented July 22, 1952

2,604,478

UNITED STATES PATENT OFFICE 2,604,478

HETEROCYCLIC POLYNUCLEAR KETO ALKENOIC ACIDS AND THE PRODUCTION THEREOF

Robert R. Burtner, Skokie, Ill., assignor to G. D. Searle & Co., Chicago, Ill., a corporation of Illinois No Drawing. Application June 22, 1949, Serial No. 100,767

12 Claims. (Cl. 260—327)

1

This invention relates to aliphatic keto acids and derivatives thereof substituted by polycyclic aromatic heterocyclic radicals, and to processes for the production thereof. In particular it relates to compounds having the general formula Ar—CO—R—COOX wherein Ar represents a polycyclic aromatic heterocyclic radical, R represents a bivalent aliphatic hydrocarbon radical, and X represents hydrogen, alkyl or aralkyl radicals, or cations derived from inorganic or organic bases.

This application is a continuation-in-part of the copending application of myself and John M. Brown, Serial No. 772,456, filed September 5, 1947, now U. S. Patent No. 2,480,220, issued August 30, 1949.

The compounds which comprise this invention are useful as therapeutic agents. They are in general choleretic agents and as such affect the flow of bile. They are also antimetabolites for certain bacteria. In the form of salts these acids are soluble in water and may be administered by a parenteral route. In the form of free acids or esters or salts they may be administered orally.

In the foregoing general formula the polycyclic aromatic heterocyclic radical represented by Ar is chosen from the radicals derived from polynuclear substances which are aromatic in character and which include xanthene, thioxanthene, phenoxthin and thianthrene. The bivalent radical, R, is an aliphatic radical derived from an aliphatic hydrocarbon, which may be saturated or unsaturated. The grouping R includes alkylene radicals of 1–8 carbon atoms such as methylene, ethylene, propylene, trimethylene, butylene, tetramethylene, hexamethylene and octamethylene, wherein the hydrocarbon chain may be straight or branched. It further includes radicals derived from unsaturated hydrocarbons such as those derived from olefins such as ethylene, propylene and butylene, and from acetylenes and related unsaturated aliphatic hydrocarbons. Among the derivatives of keto acids corresponding to the foregoing general formula, which are within the purview of this invention, are salts of alkali and alkaline earth metals, salts of aliphatic amines and esters of aliphatic and araliphatic alcohols such as the methyl, ethyl, propyl, benzyl and related alcohols. Alkaline salts of these acids may be prepared by solution of the acid in an alkaline carbonate solution, such as sodium carbonate, followed by salting-out with a salt, as for example sodium chloride. Likewise such salts may be prepared by treatment of an alcoholic solution of the acid with an alcoholic solution of alkali. The salts are often insoluble in the alcohol and may be obtained as precipitates. In other cases another solvent such as ether or benzene may be added to throw down the salt. Salts of aliphatic amines may be obtained by treating a solution of the acid in an organic solvent with a solution of the amine in a similar solvent and precipitating the desired salt with another miscible solvent in which the salt is insoluble.

The unsaturated acids to which this invention relates can be produced by halogenating a keto acid of the formula Ar—CO—$C_nH_{2n}$—COOH wherein Ar has the meaning given hereinabove and $n$ is an integer greater than 1 and not greater than 8, and dehydrohalogenating the resulting keto halo acid. The keto acids which are starting materials for these processes are obtained as disclosed in the Burtner and Brown application Serial No. 772,456, filed September 5, 1947. The halogenation is carried out in an inert solvent such as a halogenated hydrocarbon, a saturated hydrocarbon or a lower alkanoic acid. Among the halogenating agents which are suitable are chlorine, bromine, sulfuryl chloride, sulfuryl bromide, iodine chloride, N-bromosuccinimide, N-bromoacetamide, and the like. Preferred dehydrohalogenating agents are weak bases such as alkali metal salts of lower alkanoic acids, as for example sodium or potassium acetate.

My invention is further disclosed by means of the following examples, which are set forth for the purpose of illustration and which in no way are to be construed as limiting the invention in spirit or in scope. It will be apparent to those skilled in the art that innumerable conventional modifications in solvent, temperature, catalyst and reagents can be adopted without departure from the intent and purpose of this invention.

Example 1

A. To a solution of 29.8 parts of γ-(2-thioxanthene)-γ-oxobutyric acid in 350 parts of glacial acetic acid at 60° C. is added with good agitation over a period of about 1 hour a solution of 16 parts of bromine in 50 parts of glacial acetic acid. The mixture is agitated at about 60° C. for ½ hour longer. Then about 80% of the solvent is removed by evaporation under reduced pressure. The residue is diluted with 250 parts of petroleum ether and chilled. The precipitate of γ-(2-thioxanthene)-γ-oxo-β-bromobutyric acid is separated and dried.

B. A solution of 33 parts of the foregoing bromo acid and 6 parts of fused sodium acetate in 110 parts of glacial acetic acid is refluxed and agitated for about 1 hour. The hot mixture is poured into 1000 parts of ice and water. The precipitate of γ-(2-thioxanthene)-γ-oxocrotonic acid is separated, washed well with water and dried at 60–65° C. It has the formula

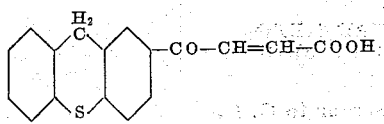

C. 31.4 parts of γ-(2-thianthrene)-γ-oxobutyric acid are brominated as in part A above with 16 parts of bromine. The resulting γ-(2-thianthrene)-γ-oxo-β-bromobutyric acid (34 parts) is refluxed with 6 parts of fused sodium acetate in glacial acetic acid as in part B above. The hot mixture is poured into a large volume of ice water and the precipitate of γ-(2-thianthrene)-γ-oxocrotonic acid is separated, washed thoroughly with water, and dried. It has the formula

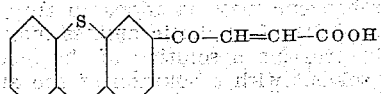

*Example 2*

A. 15 parts of γ-(2-phenoxthin)-γ-oxobutyric acid are brominated in 150 parts of acetic acid with a solution of 8 parts of bromine in 25 parts of acetic acid, according to the method of Example 1A. γ-(2-phenoxthin)-γ-oxo-β-bromobutyric acid melts at about 173° C. (with decomposition).

B. A solution of 16 parts of γ-(2-phenoxthin)-γ-oxo-β-bromobutyric acid and 5.8 parts of fused sodium acetate in 50 parts of acetic acid is refluxed for 40 minutes. The unsaturated acid is isolated as in Example 1B. After recrystallization from acetic acid γ-(2-phenoxthin)-γ-oxocrotonic acid melts at about 190° C. It has the formula

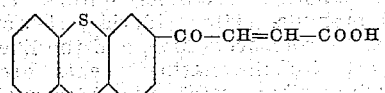

I claim:
1. A compound having the formula

Ar—CO—R—COOX wherein Ar is a monovalent radical of a polynuclear aromatic heterocyclic compound selected from the group consisting of xanthene, thioxanthene, phenoxthin and thianthrene, R is a bivalent olefinic hydrocarbon radical, and X is a member of the group consisting of hydrogen, alkyl radicals and cations.

2. A compound as in claim 1 wherein R is a bivalent olefinic radical.
3. A compound as in claim 1 wherein R is a vinylene radical.
4. γ-Thioxanthene-γ-oxocrotonic acid and salts thereof.
5. γ-Thianthrene-γ-oxocrotonic acid and salts thereof.
6. γ-Phenoxthin-γ-oxocrotonic acid and salts thereof.
7. γ-(2-thioxanthene)-γ-oxocrotonic acid.
8. γ-(2-thianthrene)-γ-oxocrotonic acid.
9. γ-(2-phenoxthin)-γ-oxocrotonic acid.
10. The process of producing a compound as in claim 1 which comprises halogenating an acid of the formula

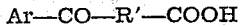
Ar—CO—R'—COOH wherein Ar is a monovalent radical of a polynuclear aromatic heterocyclic compound selected from the group consisting of xanthene, thioxanthene, phenoxthin and thianthrene, and R' is a bivalent saturated aliphatic hydrocarbon radical, and subsequently dehydrohalogenating the resulting halogenated acid.

11. The process of producing an acid of the formula

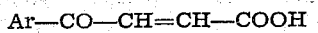
Ar—CO—CH=CH—COOH wherein Ar is a monovalent radical of a polynuclear aromatic heterocyclic compound selected from the group consisting of xanthene, thioxanthene, phenoxthin and thianthrene, which comprises halogenating an acid of the formula

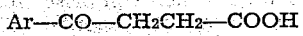
Ar—CO—CH$_2$CH$_2$—COOH and subsequently dehydrohalogenating the resulting halogenated acid.

12. The process of producing γ-phenoxthin-γ-oxocrotonic acid which comprises halogenating γ-phenoxthin-γ-oxobutyric acid and dehydrohalogenating the resulting halogenated acid with an alkali metal lower alkanoate.

ROBERT R. BURTNER.

REFERENCES CITED

The following references are of record in the file of this patent:

UNITED STATES PATENTS

| Number | Name | Date |
|---|---|---|
| 2,480,220 | Burtner | Aug. 30, 1949 |

OTHER REFERENCES

Weygand: Organic Preparations, pp. 79 and 422, Inter-Science Publ., N. Y., 1945.